United States Patent
Yoshinari et al.

(10) Patent No.: US 9,391,305 B2
(45) Date of Patent: Jul. 12, 2016

(54) BACKPACK-TYPE POWER SUPPLY INCLUDING OPERATION PORTION

(71) Applicant: Hitachi Koki Co., Ltd., Tokyo (JP)

(72) Inventors: Takuya Yoshinari, Hitachinaka (JP); Haruhisa Fujisawa, Hitachinaka (JP); Takafumi Itoh, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 13/935,347

(22) Filed: Jul. 3, 2013

(65) Prior Publication Data

US 2014/0011061 A1    Jan. 9, 2014

(30) Foreign Application Priority Data

Jul. 6, 2012 (JP) ................. 2012-153123
Jul. 6, 2012 (JP) ................. 2012-153128

(51) Int. Cl.
*H01M 2/10*    (2006.01)
*B25F 5/00*    (2006.01)
*H01M 10/48*    (2006.01)

(52) U.S. Cl.
CPC .............. *H01M 2/1022* (2013.01); *B25F 5/00* (2013.01); *H01M 10/482* (2013.01)

(58) Field of Classification Search
None
See application file for complete search history.

(56) References Cited

U.S. PATENT DOCUMENTS

| | | | | |
|---|---|---|---|---|
| 5,929,597 A | * | 7/1999 | Pfeifer | B25F 5/00 320/107 |
| 6,563,532 B1 | | 5/2003 | Strub et al. | |
| 8,410,756 B2 | | 4/2013 | Sakakibara et al. | |
| 2006/0220612 A1 | * | 10/2006 | Feldmann et al. | 320/114 |
| 2007/0292749 A1 | | 12/2007 | Coombs et al. | |
| 2010/0308086 A1 | * | 12/2010 | Chapuis | 224/148.2 |
| 2010/0313325 A1 | * | 12/2010 | Ebejer | 2/80 |
| 2010/0320969 A1 | * | 12/2010 | Sakakibara et al. | 320/118 |

FOREIGN PATENT DOCUMENTS

| | | |
|---|---|---|
| CN | 202016044 | * 10/2011 |
| FR | 2949906 A1 | 3/2011 |
| FR | 2958083 A1 | 9/2011 |
| FR | 2968523 A1 | 6/2012 |
| JP | H01-166901 | 11/1989 |
| JP | H07-003983 U | 1/1995 |
| JP | 3018620 U | 11/1995 |
| JP | 2000-164182 A | 6/2000 |
| JP | 3128790 U | 1/2007 |
| JP | 2011-055680 A | 3/2011 |
| JP | 2011-216304 A | 10/2011 |
| WO | 2013/005206 A1 | 1/2013 |

OTHER PUBLICATIONS

Machine Translation of CN202016044 published Oct. 2011.*

(Continued)

*Primary Examiner* — Patrick Ryan
*Assistant Examiner* — Wyatt McConnell
(74) *Attorney, Agent, or Firm* — Kilpatrick Townsend & Stockton LLP

(57) ABSTRACT

The backpack-type power supply includes a rechargeable battery, a case, a harness, and an operation unit. The case accommodates the rechargeable battery. A user wears the case on a back of the user by the harness. The operation unit includes at least one of a switch and a display unit. The switch is configured to enable or disable the rechargeable battery. The display unit is configured to display a battery level of the rechargeable battery.

11 Claims, 22 Drawing Sheets

(56) References Cited

OTHER PUBLICATIONS

Japanese Patent Application No. 2012-153128, Office Action (Notification of Reasons for Refusal), dated Oct. 8, 2015, with English translation.

French Patent Office search report for patent application FR1356630 (Jan. 26, 2016).

Japan Patent Office office actions JPO patent application JP2012-153123 (Jan. 29, 2016).

Japan Patent Office office actions JPO patent application JP2012-153123 (Feb. 29, 2016).

* cited by examiner

BACKPACK-TYPE POWER SUPPLY INCLUDING OPERATION PORTION

CROSS REFERENCE TO RELATED APPLICATION

This application claims priority from Japanese Patent Application No. 2012-153123 filed Jul. 6, 2012 and Japanese Patent Application No. 2012-153128 filed Jul. 6, 2012. The entire contents of the priority applications are incorporated herein by reference.

TECHNICAL FIELD

The present invention relates to a backpack-type power supply housing rechargeable batteries.

BACKGROUND

Japanese Utility Model Application Publication No. 7-3983 provides a portable power supply for power tools and other equipment is to accommodate the rechargeable batteries in a waist belt that can be worn about the user's waist.

SUMMARY

In view of the foregoing, it is an object of the present invention to provide a backpack-type power supply having a larger capacity than the conventional waist belt power supply.

In order to attain the above and other objects, the invention provides a backpack-type power supply. The backpack-type power supply includes a rechargeable battery, a case, a harness, and an operation unit. The case accommodates the rechargeable battery. A user wears the case on a back of the user by the harness. The operation unit includes at least one of a switch and a display unit. The switch is configured to enable or disable the rechargeable battery. The display unit is configured to display a battery level of the rechargeable battery.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
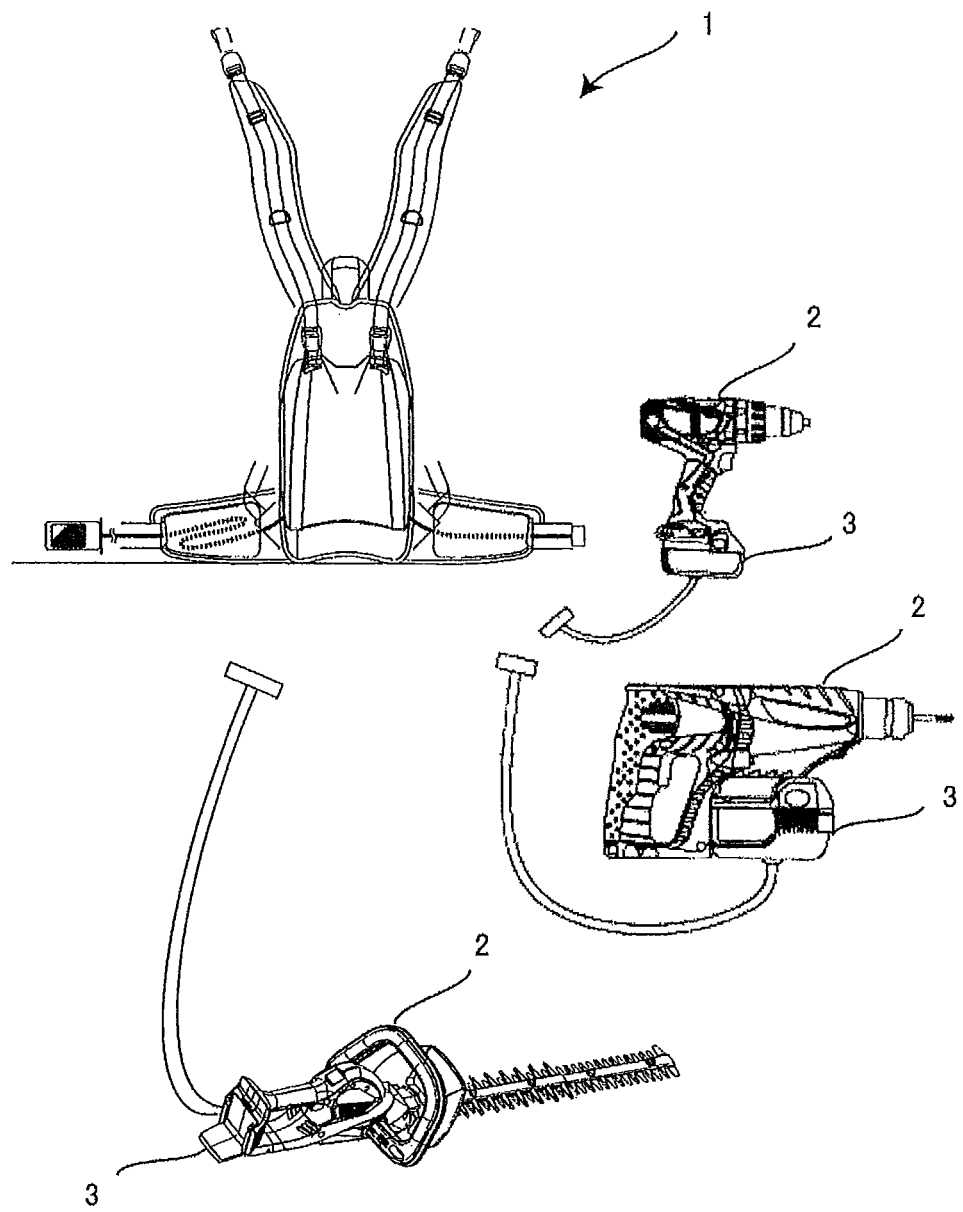
FIG. 1 is an explanation diagram explaining a usage of a backpack-type power supply according to a first embodiment.

FIG. 1 shows a backpack-type power supply 1 according to a preferred embodiment of the present invention. The backpack-type power supply 1 accommodates a battery pack 51 (see FIG. 7) for powering a power tool 2. The terms "upward", "downward", "upper", "lower", "above", "below", "beneath", "right", "left", and the like indicate directions when the user wears the backpack-type power supply 1 on his back. The battery pack 51 accommodated in the backpack-type power supply 1 can be worn on the user's back while the user operates the power tool 2.

An adapter 3 is connected between the backpack-type power supply 1 and the power tool 2 so that power can be supplied from the battery pack 51 to the power tool 2. A charger 4 (see FIG. 7) can be used to charge the battery pack 51 by connecting the adapter 3 between the backpack-type power supply 1 and the charger 4.

Figure 2A:
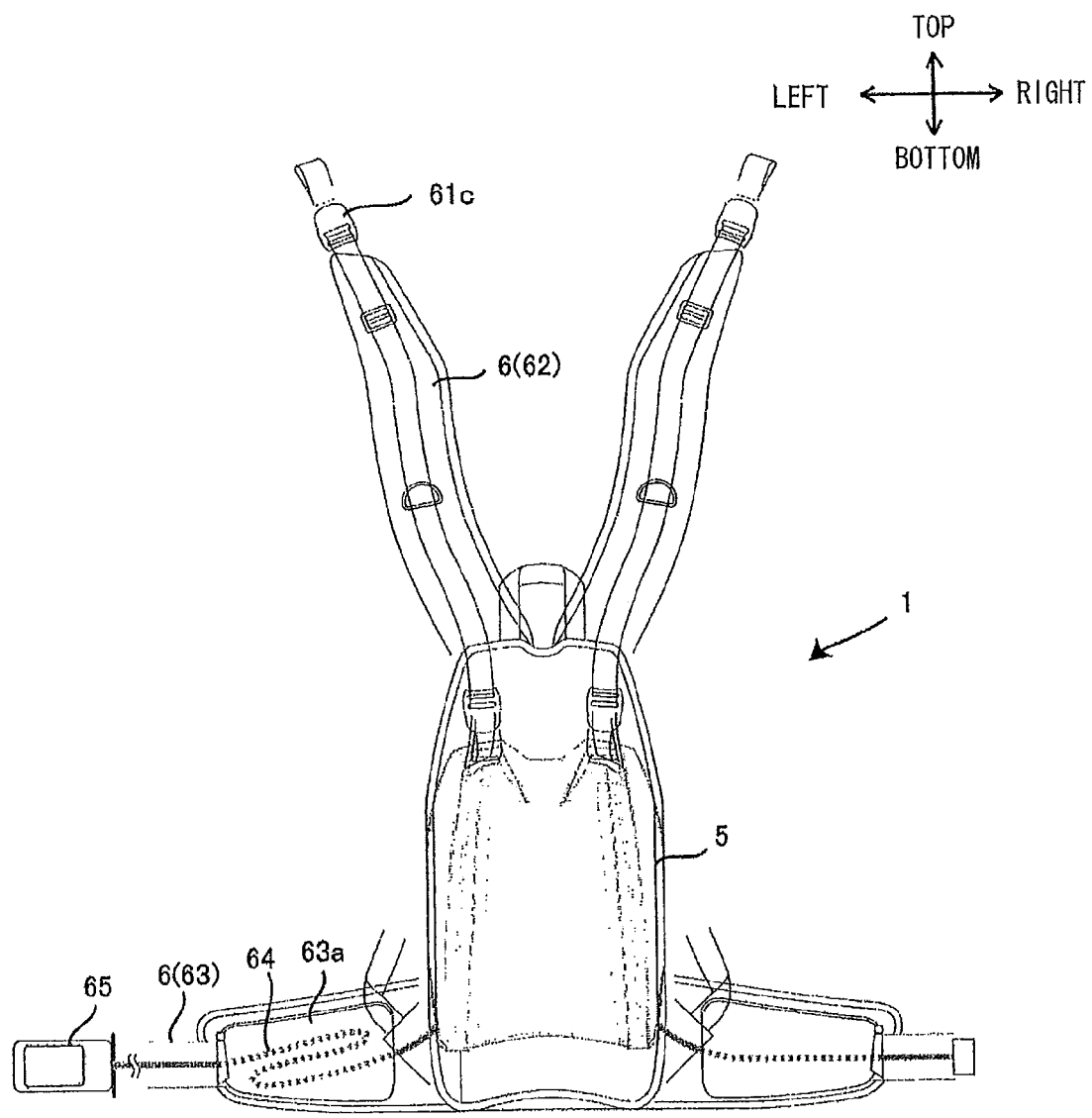
FIG. 2(a) is a front view of the backpack-type power supply according to the first embodiment.
Figure 2B:
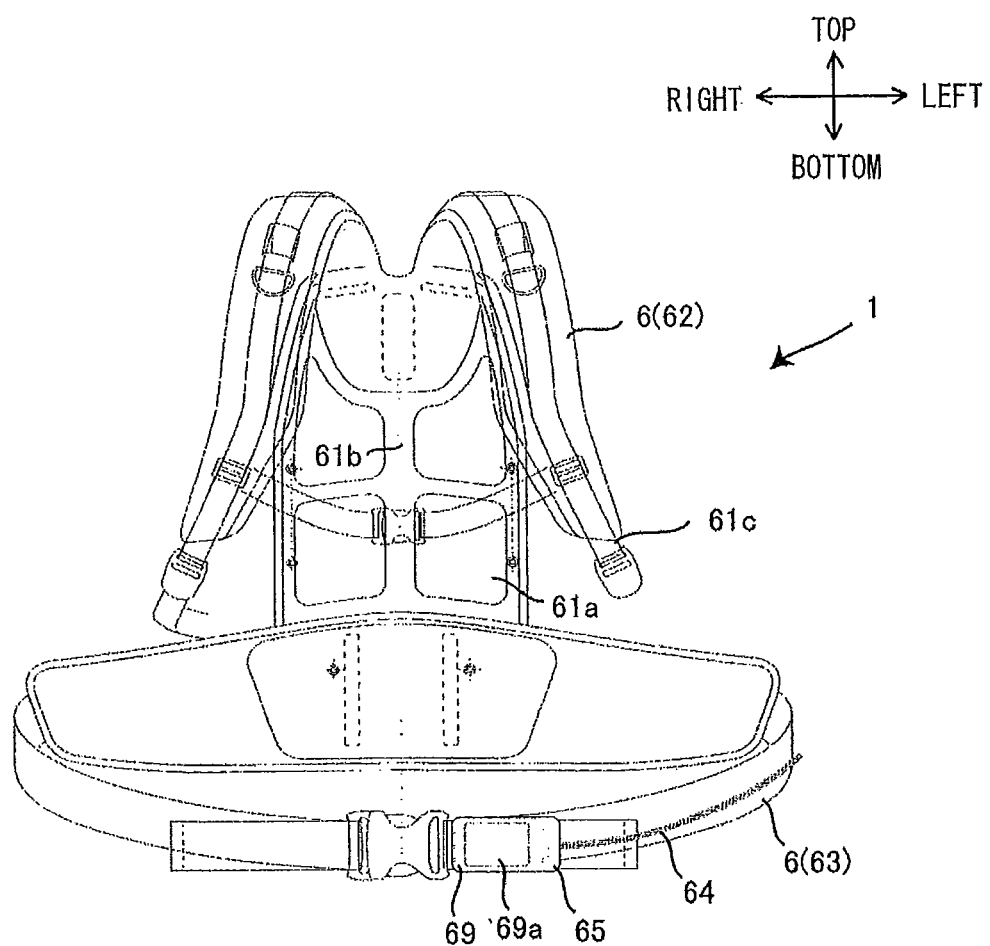
FIG. 2(b) is a back view of the backpack-type power supply according to the first embodiment.

As shown in FIGS. 2(a) and 2(b), the backpack-type power supply 1 includes a case 5, and a harness 6. The external pattern and shape of the backpack-type power supply 1 in FIGS. 1, 2(a), and 2(b) differ slightly from those in the other drawings, but the backpack-type power supply 1 in all drawings is configured to achieve the same functions described in the preferred embodiment.

Figure 3:
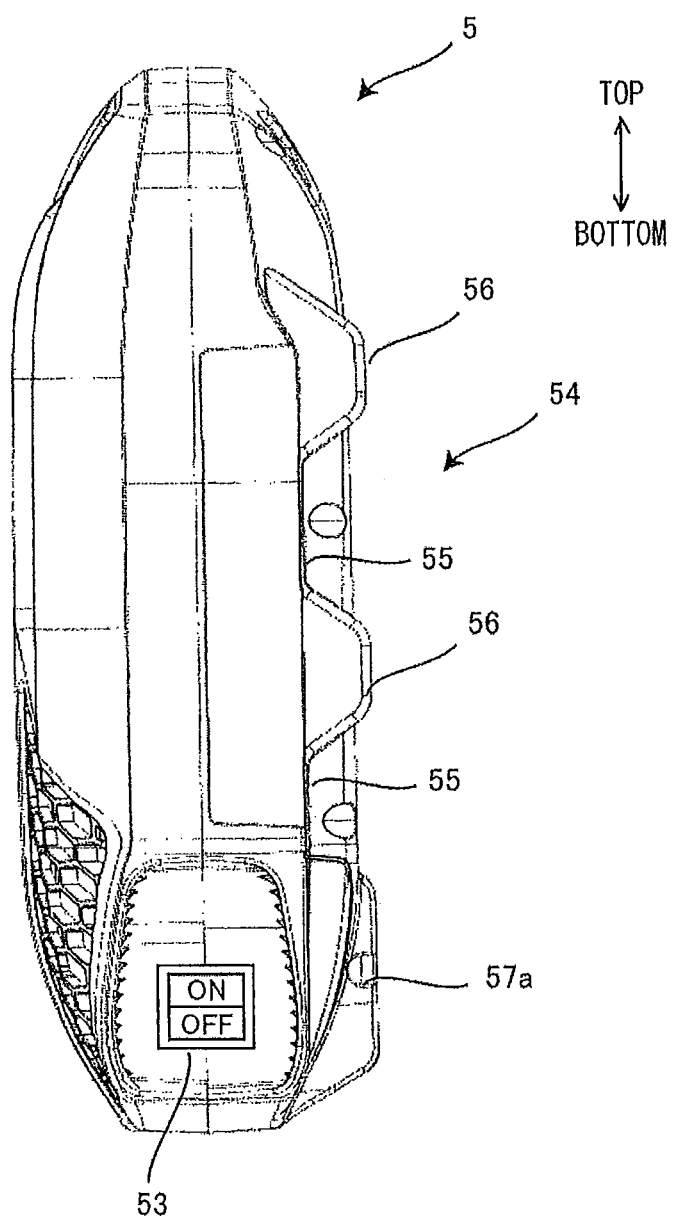
FIG. 3 is a side view of a case according to the first embodiment.
Figure 7:
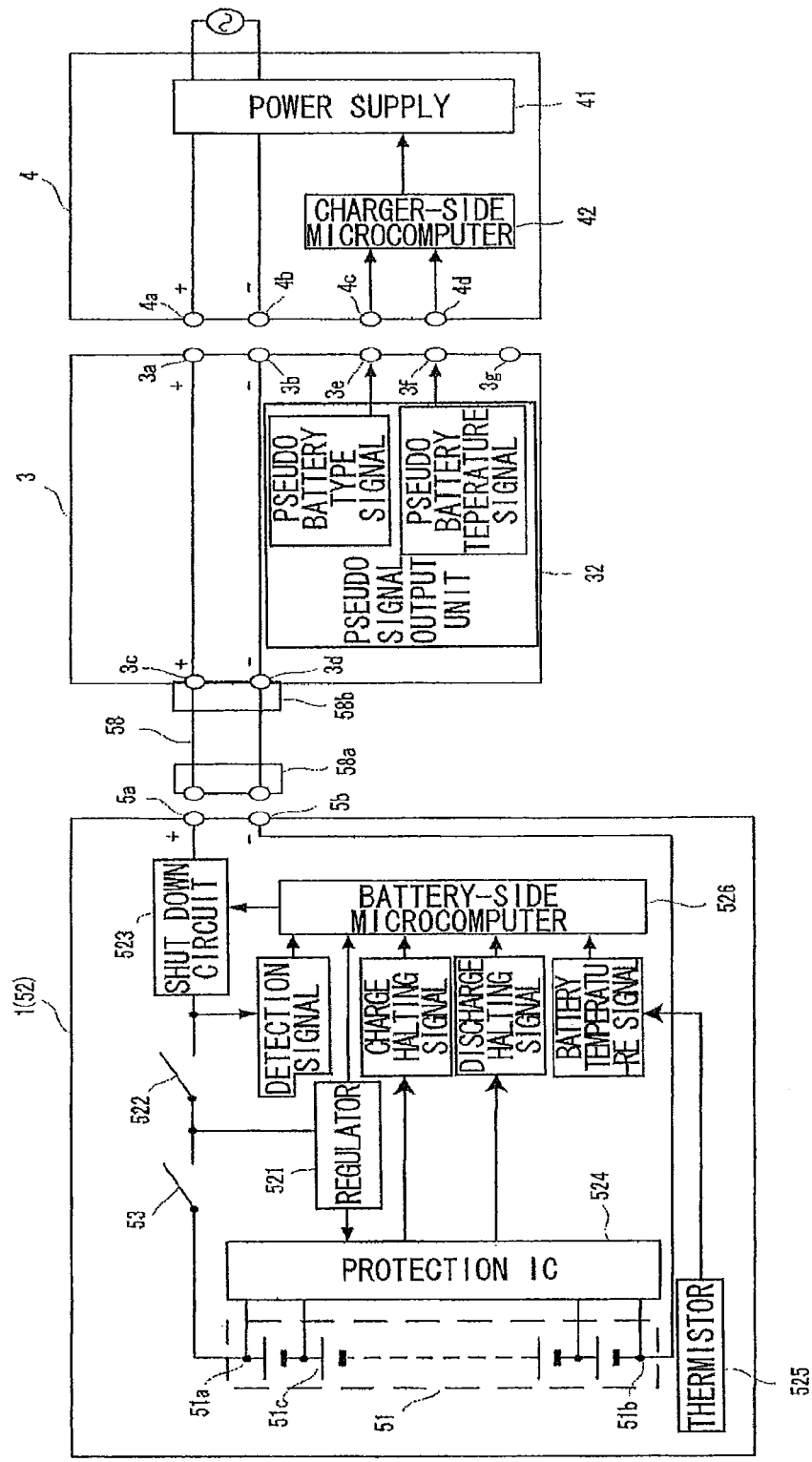
FIG. 7 is a circuit diagram of the backpack-type power supply, an adapter, and a charger, according to the first embodiment.

The case 5 has a box-like shape and accommodates the battery pack 51, as well as a control board 52 (see FIG. 7). As shown in FIG. 3, a main power switch 53 is also provided on the side surface of the case 5.

The battery pack 51 is configured of a plurality of secondary cells 51c (see FIG. 7) connected in series. In the preferred embodiment, the battery pack 51 has a large capacity and, more specifically, is configured of a plurality of secondary cell units arranged parallel to each other, each unit having a plurality of secondary cells 51c connected in series.

The structures of the control board 52 and the main power switch 53 will be described later.

Figure 4:
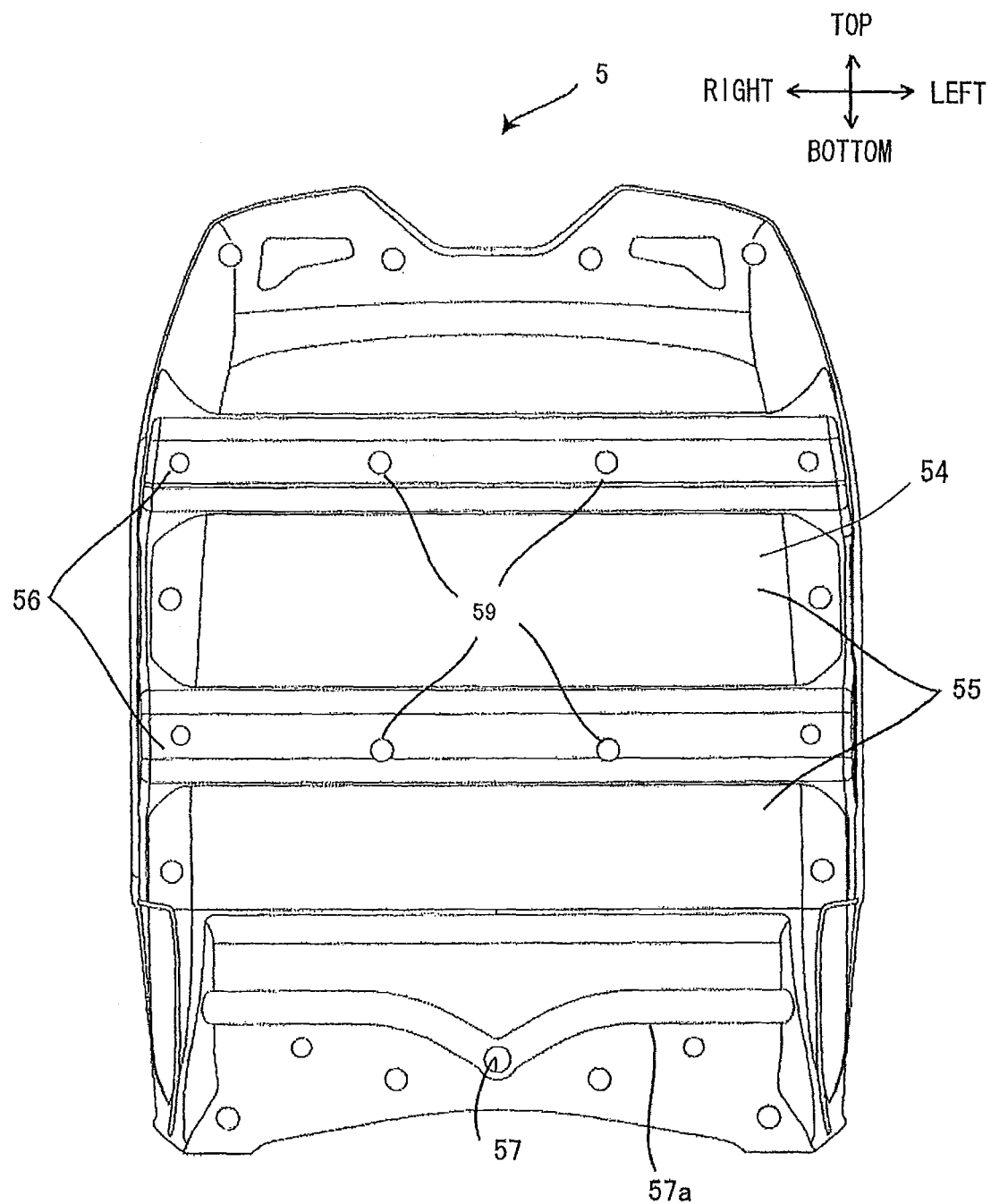
FIG. 4 is a back view of the case according to the first embodiment.

As shown in FIGS. 3 and 4, the case 5 includes a contact surface 54 that rests against the user's back when the backpack-type power supply 1 is worn. The contact surface 54 is formed of a resin material or a metal material, such as aluminum, and has a generally square shape. Recessions 55 and protrusions 56 elongated in the left-right direction are formed in/on the contact surface 54, alternating vertically. Thus, when the backpack-type power supply 1 is being worn, the user's back contacts the protrusions 56 through a padded part 61 described later, with space formed in the recessions 55 between the contact surface 54 and the user's back (the padded part 61).

Since the battery pack 51 according to the preferred embodiment has a large capacity as described above, the temperature of the battery pack 51 is likely to rise to a level that is not comfortable to the user's touch as the backpack-type power supply 1 is being used. However, since the above-described structure of the backpack-type power supply 1 allows air to pass between the user's back and the contact surface 54, the amount of heat generated in the battery pack 51 that is transmitted to the user's back is greatly reduced, preventing the user's back from becoming hot and sweaty.

A particular feature of the preferred embodiment is that the recessions 55 and the protrusions 56 extend in the left-right (horizontal) direction, as illustrated in FIGS. 3 and 4. With this construction, the space formed in the recessions 55 next to the user's back passes through the contact surface 54 in the left-right direction, allowing the passage of air, which tends to flow horizontally. Accordingly, this configuration further reduces the amount of heat generated in the battery pack 51 that is transferred to the user's back, thereby further preventing the user's back from becoming hot and sweaty.

Figure 5:
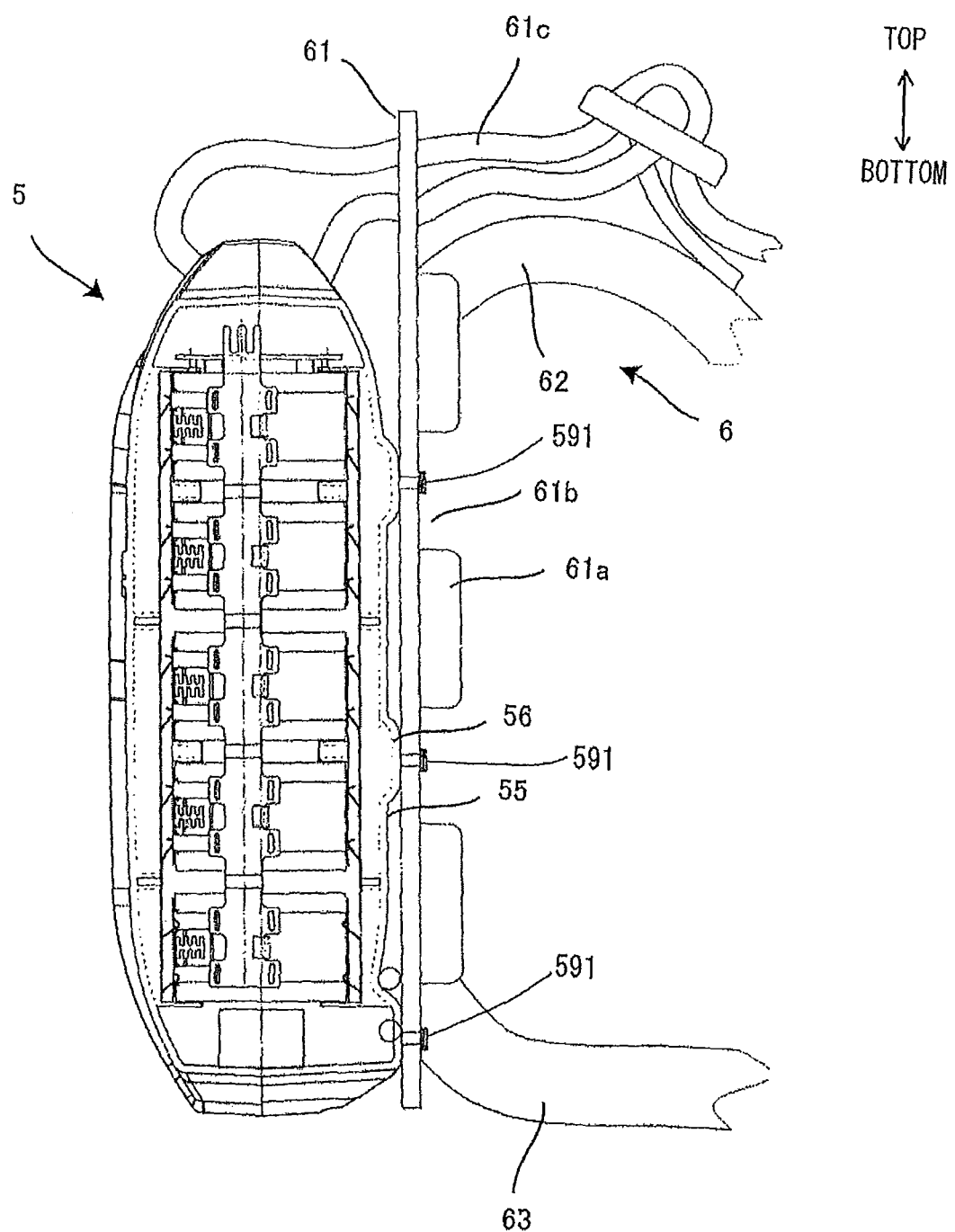
FIG. 5 is a side view of the backpack-type power supply according to the first embodiment.

Further, in the preferred embodiment the interior of the protrusions 56 that contact the user's back are hollow cavities, as shown in FIG. 5, in which components such as the battery pack 51 and the control board 52 are not provided. This configuration can adiabatically separate the battery pack 51 from the user's back, thereby further reducing the amount of heat generated in the battery pack 51 that is transmitted to the user's back and thus preventing the user's back from becoming hot and sweaty.

As shown in FIG. 4, a cable extension through-hole 57 is formed in the lower portion of the contact surface 54 and located at a center portion of the contact surface 54 in the horizontal direction. A power cable 58 connected to the power tool 2 (the adapter 3) extends from the cable extension hole 57 in a direction angled upward from the horizontal. The power cable 58 is electrically connected to the battery pack 51. This configuration prevents the power cable 58 from coming into contact with the ground or other surface when the user sits on this surface while carrying the backpack-type power supply 1 on his or her back. Such contact with the ground could interfere with the user performing operations in a sitting position.

As shown in FIGS. 3 and 4, a guide groove 57a is formed in the contact surface 54. The guide groove 57a extends both leftward and rightward from the cable extension hole 57, allowing the power cable 58 to be guided along the guide groove 57a toward either the left or right side of the contact surface 54. Accordingly, this configuration improves operability since the power cable 58 can be extended to the desired side of the contact surface 54, depending on whether the user is left-handed or right-handed and the type of power tool 2 that the user is operating. Further, this configuration prevents a decreased efficiency in operating a power tool 2 connected to the end of the power cable 58 caused by the power cable 58 hanging too low.

As shown in FIGS. 2(a), 2(b), and 5, the harness 6 includes the padded part 61, a pair of shoulder belts 62, and a pair of waist belts 63.

The padded part 61 is formed of a non-rigid member at substantially the same size as the contact surface 54 and is disposed so as to be between the contact surface 54 and the user's back. As shown in FIGS. 2(b) and 5, a plurality of recessions 61b are formed in the padded part 61 by a plurality of cushioned contact parts (protrusions) 61a. A part of the recessions 61b extends in the horizontal direction and another part of the recessions 61b extends in the vertical direction. This construction ensures that air can pass between the padded part 61 and the user's back, thereby reducing the amount of heat generated in the battery pack 51 that is transferred to the user's back and, thus, preventing the user's back from becoming hot and sweaty.

As shown in FIG. 2(b), the two shoulder belts 62 extends from the top of the padded part 61 toward downside. As shown in FIGS. 2(a), 2(b), and 5, a pair of top straps 61c extending from the case 5 on both left and right sides of the padded part 61 engage with respective shoulder belts 62. By adjusting the lengths of the top straps 61c, the user can adjust the gap formed between the user's back (harness 6, or more specifically, padded part 61) and the case 5 and can efficiently distribute the weight of the case 5 on the shoulder belts 62, ensuring that the case 5 is fitted properly on the user's back. Further, by allowing the center of gravity of the case 5 to be brought close to the user, this configuration reduces the potential for the user to lose balance and fall backward. Further, distributing the weight of the case 5 efficiently on the shoulder belts 62 greatly reduces user fatigue.

The shoulder belts 62 run from top to bottom along both sides of the padded part 61, thereby forming loops. The backpack-type power supply 1 is placed on one's back by inserting the arms and shoulders into the loops formed by the shoulder belts 62.

The waist belts 63 extend in a general horizontal direction from each side (left side or right side) of the padded part 61 on the bottom portion thereof. The distal ends of both waist belts 63 are configured to engage with each other. By engaging these ends, the backpack-type power supply 1 (contact surface 54) can be fitted to the user's body.

An auxiliary belt arranged horizontally may be disposed above the waist belts 63, with the left and right ends of the auxiliary belt engaging the left and right shoulder belts 62, respectively. The addition of this auxiliary belt reduces rubbing between the backpack-type power supply 1 (contact surface 54) and the user's body as the user is working.

The padded part 61 to which the shoulder belts 62 and the waist belts 63 are connected is fixed to the contact surface 54 with a plurality of screws 591. The screws 591 are inserted through screw holes 59 formed in the contact surface 54 (see FIG. 4). With the backpack-type power supply 1 according to the preferred embodiment, sufficient care must be taken to engage the case 5 to the harness 6 since the battery pack 51 has considerable weight. Fixing the padded part 61 to the contact surface 54 with screws 591 inserted into the screw holes 59 formed in the contact surface 54 prevents the case 5 from becoming disconnected from the harness 6. Further, the force required to engage the case 5 to the harness 6 is distributed through the top straps 61c and related configuration.

The screw holes 59 are formed toward the left-right center from both sides of the padded part 61 (contact surface 54). The screws 591 fix the padded part 61 to the case 5 at positions apart from both ends of the padded part 61 in the horizontal direction, that is, at center side positions from both ends of the padded part 61 in the horizontal direction. Since this construction does not fix both left and right ends of the padded part 61 to the case 5, the padded part 61, which is formed of a non-rigid member, can flex and conform to the user's body.

As shown in FIGS. 2(a) and 2(b), an operation cable 64 connected to the control board 52 extends from the case 5. An operation unit 65 is connected to the distal end of the operation cable 64.

Figure 6A:
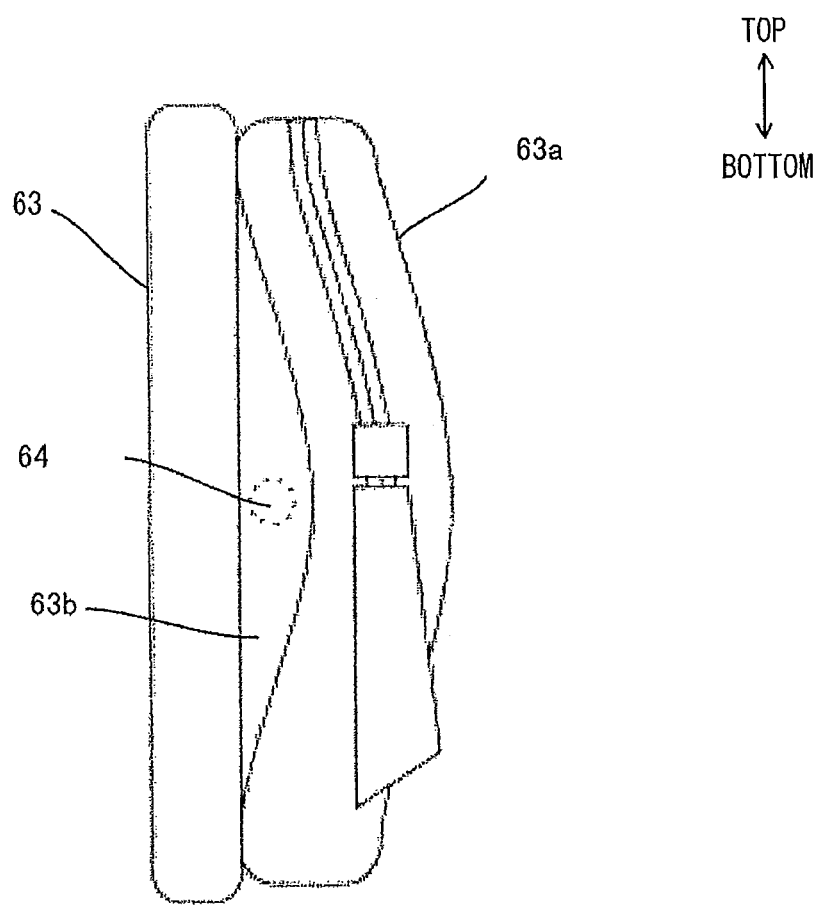
FIG. 6(a) is a side view of a pocket according to the first embodiment.

As shown in FIGS. 2(a) and 6(a), a pocket (cover part) 63a is attached to each waist belt 63. The pocket 63a forms a space 63b with the waist belt 63 that allows the operation unit 65 and the operation cable 64 to pass therethrough and that accommodates excess portions of the operation cable 64. This construction reduces the possibility of the excess portion of the operation cable 64 catching on a branch or the like while the user is wearing the backpack-type power supply 1 and, hence, prevents a reduction in operating efficiency. Further, since this configuration hides excess portions of the operation cable 64 regardless of the user's body type, the backpack-type power supply 1 is not more or less user-friendly for any specific body type.

Figure 6B:
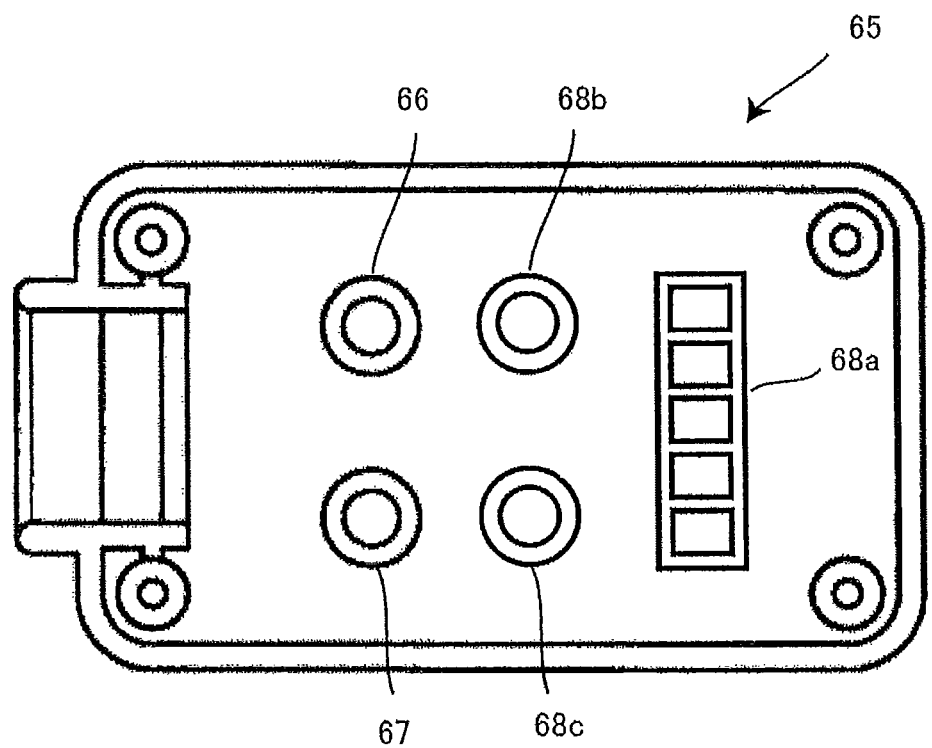
FIG. 6(b) is a plain view of an operation unit according to the first embodiment.

As shown in FIG. 6(b), the operation unit 65 has a box-like shape. On the front surface of the operation unit 65 are provided an auxiliary power switch 66, a battery level switch 67, battery level LEDs 68a, a power LED 68b, and a malfunction LED 68c.

By switching off the auxiliary power switch 66, the user can halt the supply of power from the backpack-type power supply 1 to the power tool 2. By operating the battery level switch 67, the user can display the amount of battery life in the battery pack 51 on the battery level LEDs 68a at a precision of five levels. With the operation unit 65 mounted on the waist belt 63 that extends from the padded part 61 in the above construction, the user can easily confirm the battery level in the battery pack 51 and the like while carrying the case 5 on his or her back, i.e., while working with the power tool 2.

As shown in FIG. 2(b), the operation unit 65 is accommodated in a housing unit 69 attached to the waist belt 63 with a hook and loop fastener. For purposes of inserting the operation unit 65 through the space 63b (FIG. 6(a)) formed between the pocket 63a and the waist belt 63, it would be preferable to keep the operation unit 65 in its bare state, not housed in the housing unit 69 or the like. However, when not accommodated in the housing unit 69, the operation unit 65 is vulnerable to potentially damaging impacts and unanticipated water exposure, for example.

Therefore, the operation unit 65 in the preferred embodiment is accommodated in the housing unit 69 after being inserted through the space 63b. This approach facilitates insertion of the operation unit 65 through the space 63b while reducing the likelihood of the operation unit 65 incurring damage, being short-circuited, or the like.

The housing unit 69 includes a transparent part 69a through which the user can see the battery level LEDs 68a, the power LED 68b, and the malfunction LED 68c. In this way, the user can visually confirm the states of the LEDs and the like while they are maintained on the waist belt 63.

Figure 6C:
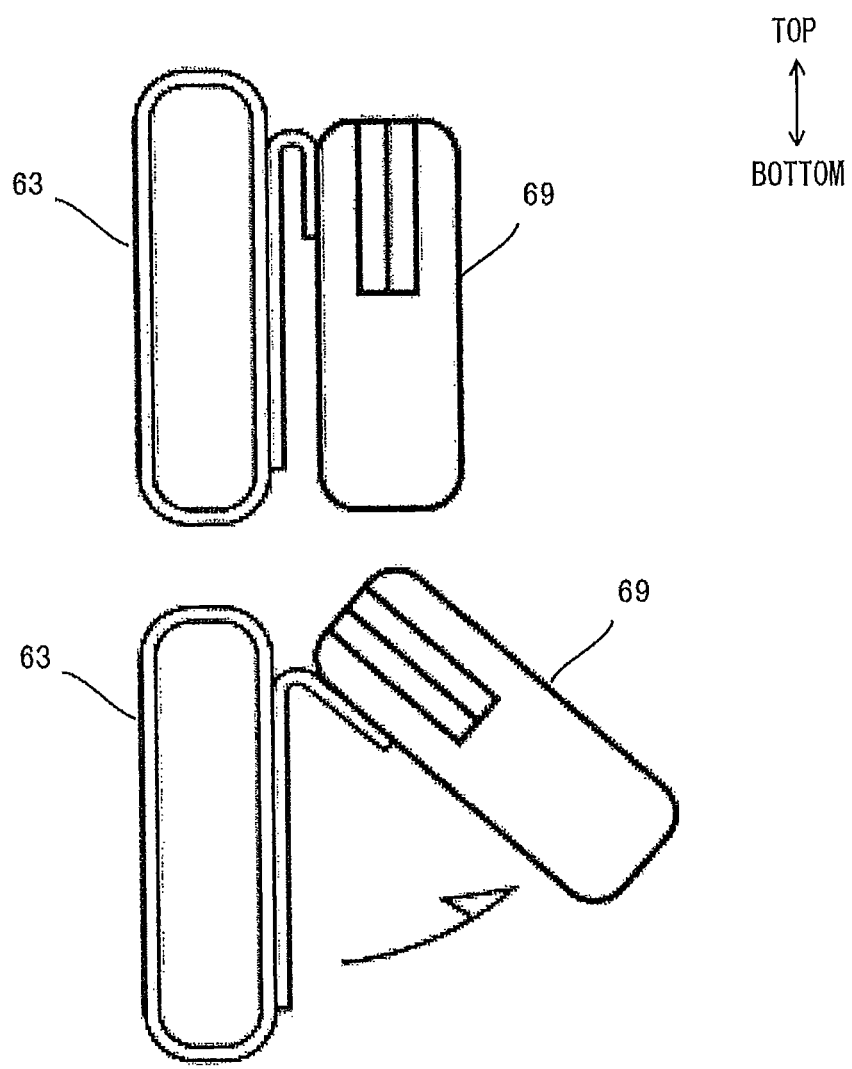
FIG. 6(c) is an explanation diagram of a housing unit according to the first embodiment.

As shown in FIG. 6(c), the housing unit 69 is configured to be rotatable about its top end. That is, a surface of the operation unit 65 on which the battery level LEDs 68a are provided faces upward when the housing unit 69 is rotated. The term "upward" as used herein is intended to mean in a direction angled upward from the horizontal, that is, in a direction including a vertically upward direction and a diagonally upward direction. In other words, the housing unit 69 rotates such the user can see the surface of the operation unit 65 when user wears the case 5. This construction enables the user to view the battery level LEDs 68a and the like while the operation unit 65 is retained on the waist belt 63.

Next, the structure of the control board 52 accommodated in the case 5 will be described with reference to FIG. 7. As shown in FIG. 7, the backpack-type power supply 1 housing the control board 52 is connected to the charger 4 with the adapter 3 to configure a charging system A. As described above, the backpack-type power supply 1 can also be connected to the power tool 2 using the same adapter 3.

The control board 52 includes a battery-side positive terminal 5a and a battery-side negative terminal 5b. Components mounted on the control board 52 include the main power switch 53 described above and a regulator 521, a switching element 522, a shutdown circuit 523, a protection integrated circuit 524, a thermistor 525, and a battery-side microcomputer 526.

On the outside of the backpack-type power supply 1, the battery-side terminals 5a and 5b connect to the power cable 58. On the control board 52 inside the backpack-type power supply 1, the battery-side terminals 5a and 5b connect to a positive terminal 51a and a negative terminal 51b of the battery pack 51. The main power switch 53, the switching element 522, and the shutdown circuit 523 are connected in order between the positive terminal 51a of the battery pack 51 and the battery-side positive terminal 5a.

The regulator 521 is connected to the contact point between the main power switch 53 and the switching element 522. The regulator 521 regulates the voltage outputted from the battery pack 51 to be supplied to the protection integrated circuit 524 and the battery-side microcomputer 526 as a drive voltage.

The switching element 522 is a field-effect transistor (FET). The auxiliary power switch 66 described earlier is connected to the battery-side microcomputer 526. When the auxiliary power switch 66 is switched off, the battery-side microcomputer 526 outputs an off signal to the gate of the switching element 522 for turning off the same.

With this configuration, the regulator 521 is connected to a current path provided on the battery pack 51 side of the switching element 522. Therefore, a drive power is supplied to the protection integrated circuit 524 and the battery-side microcomputer 526, even when the auxiliary power switch 66 (switching element 522), primarily used for halting power supply to the power tool 2, has been turned off.

In some cases, the backpack-type power supply 1 according to the preferred embodiment may be particularly suited to a power tool that is primarily used in a specific season. In such cases, if the backpack-type power supply 1 were stored with only the auxiliary power switch 66 (switching element 522) shut off, then power would continue to be supplied to the protection integrated circuit 524 and the battery-side microcomputer 526. This would deplete the level of the battery pack 51 by the time the backpack-type power supply 1 is used again in the following year and might even degrade the battery pack 51 due to overdischarge and the like.

Accordingly, the backpack-type power supply 1 according to the preferred embodiment provides the main power switch 53 on an electric current path disposed on the battery pack 51 side of the switching element 522, and the regulator 521 is provided on a current path connected between the main power switch 53 and the switching element 522. With this configuration, if the backpack-type power supply 1 is to be left unused for a long period of time, the power supply to the protection integrated circuit 524 and the battery-side microcomputer 526 can be shut down by switching off the main power switch 53. Allowing the power supply to be shut down in this way reduces power waste and degradation of the battery pack 51 caused by overdischarge and the like.

Further, the main power switch 53 in the preferred embodiment is configured of a mechanical switch and is therefore capable of shutting down the entire circuit independently of the auxiliary power switch 66.

The battery pack 51 in the preferred embodiment is a high-capacity battery pack capable of supplying an electric current as large as 30 A. Therefore, the main power switch 53 employed in the embodiment must be capable of withstanding such a large current.

As shown in FIG. 3, the main power switch 53 is provided on the side surface of the case 5 in the backpack-type power supply 1 according to the preferred embodiment. However, the main power switch 53 is preferably disposed in a position that the user can operate while carrying the backpack-type power supply 1, such as the bottom surface of the case 5, and is not restricted to the side surface of the case 5. This configuration not only reduces the likelihood of the user unintentionally turning off the main power switch 53 during operations, but also enables the user to shut off the power supply and the entire circuit while carrying the backpack-type power supply 1 when there is a need to shut down the entire circuit quickly.

The shutdown circuit 523 is an FET and functions to open/interrupt the circuit path formed by the battery-side positive terminal 5a, the battery pack 51, and the battery-side negative terminal 5b under control of the battery-side microcomputer 526.

The protection integrated circuit 524 outputs a charge-halting signal to the battery-side microcomputer 526 upon detecting that the battery pack 51 has reached a full charge during a charge operation, and outputs a discharge-halting signal to the battery-side microcomputer 526 upon detecting an overdischarge or overcurrent in the battery pack 51 during a discharge operation.

The thermistor 525 outputs the temperature of the battery pack 51 to the battery-side microcomputer 526 as a battery temperature signal.

The battery-side microcomputer 526 controls the shutdown circuit 523 to interrupt the current path upon receiving a charge-halting signal or a discharge-halting signal from the protection integrated circuit 524.

Since there is a potential that the battery pack 51 may begin to degrade or even malfunction if its temperature rises too high, the battery-side microcomputer 526 controls the shutdown circuit 523 to interrupt the current path when the battery temperature signal inputted from the thermistor 525 indicates a temperature greater than a prescribed level.

The battery pack 51 may also become disabled during charging when the charger 4 supplies a voltage or current to the battery pack 51 that is larger than the specification for the battery pack 51. This may occur when a charger 4 that is not compatible with the battery pack 51 is connected to the backpack-type power supply 1, for example.

Therefore, the battery-side microcomputer 526 detects the voltage and current supplied to the battery pack 51 (voltage/current detection signal) and controls the shutdown circuit 523 to interrupt the current path when the supplied voltage or current exceeds a prescribed value. In this way, the backpack-type power supply 1 according to the preferred embodiment interrupts the current path on the battery pack 51 side when determining that the battery pack 51 is fully charged or that an error has occurred. Since the backpack-type power supply 1 itself, independent of the charger 4 connected to the backpack-type power supply 1, reliably halts the supply of power to the battery pack 51 when the battery pack 51 is fully charged or when an error occurs, the backpack-type power supply 1 suppresses degradation of the battery pack 51 and the like and reduces the likelihood of the battery pack 51 malfunctioning.

Next, the structure of the charger 4 will be described. The charger 4 is a conventional device provided with a charger-side positive terminal 4a, a charger-side negative terminal 4b, a battery type input terminal 4c, a battery temperature input terminal 4d, a power supply 41, and a charger-side microcomputer 42.

The power supply 41 converts the AC power produced by a commercial power source to DC power and outputs this power via the charger-side terminals 4a and 4b as the charging power.

The charger-side microcomputer 42 controls the charging voltage and charging current outputted by the power supply 41 based on a battery type signal inputted into the battery type input terminal 4c and a battery temperature signal inputted into the battery temperature input terminal 4d. However, if a signal within the prescribed range has not been inputted into at least one of the battery type input terminal 4c and the battery temperature input terminal 4d, the charger-side microcomputer 42 prevents the power supply 41 from performing a charging operation, i.e., prevents the power supply 41 from applying a voltage across the charger-side terminals 4a and 4b.

Next, the structure of the adapter 3 will be described. The backpack-type power supply 1 is connected to either the power tool 2 or the charger 4 through the adapter 3 and the power cable 58 connected to the adapter 3.

Figure 8:
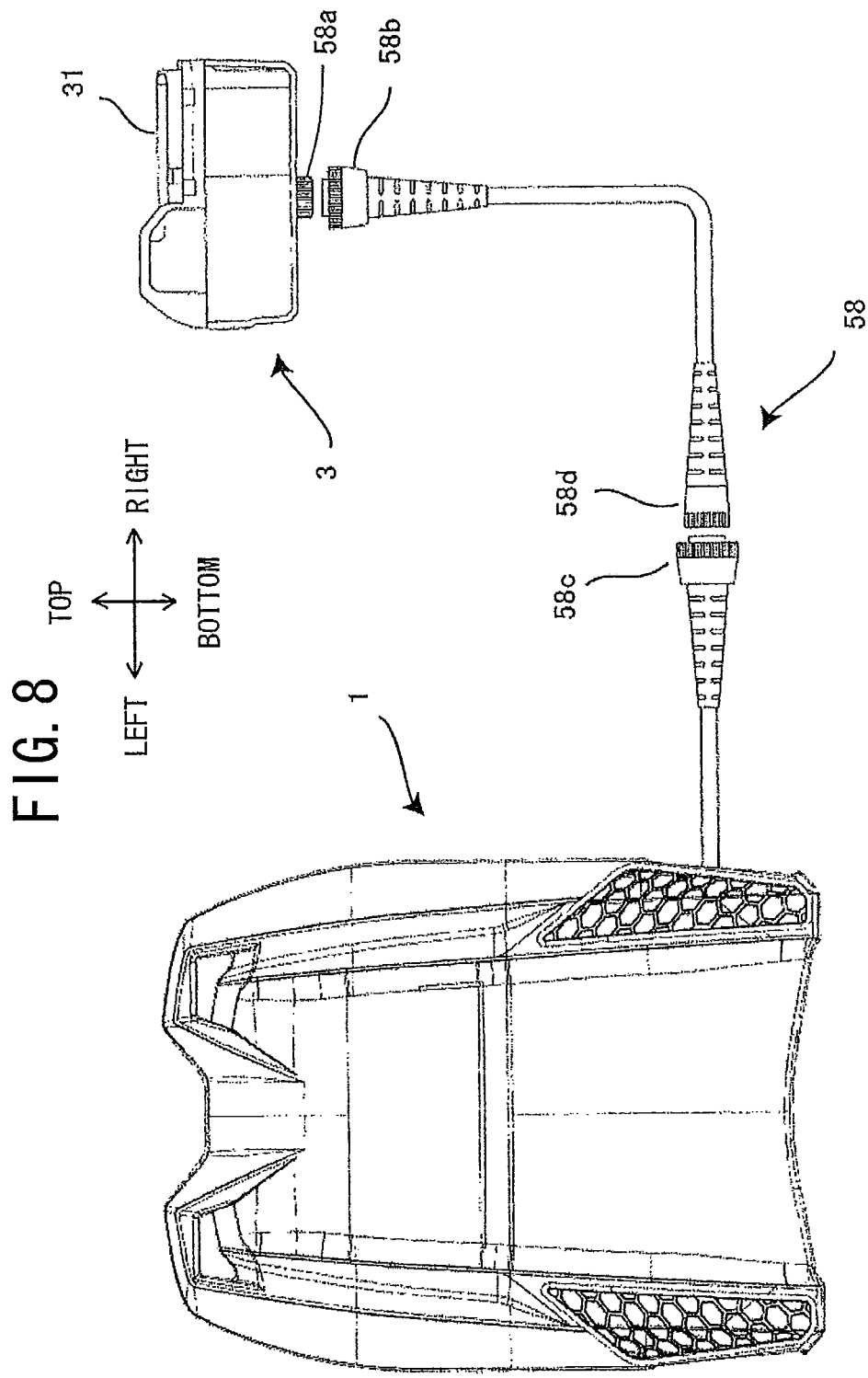
FIG. 8 is an explanatory diagram illustrating a connection between the backpack-type power supply and the adapter, according to the first embodiment.

As shown in FIGS. 7 and 8, the power cable 58 includes connectors 58a and 58b respectively provided on opposing ends thereof. A part of the power cable 58 is detachably connected to the backpack-type power supply 1 and the adapter 3 by screwing the connectors 58a and 58b into connectors on the respective component. With this configuration, if the power cable 58 were to be accidentally severed during operations, the power cable 58 could easily be replaced and operations resumed. Further, the power cable 58 can be replaced with one of a different gauge suited to the rated output of the power tool 2. For example, if the backpack-type power supply 1 is being connected to a low-output power tool 2, the power cable 58 could be replaced with a thinner power cable 58 to greatly improve operating efficiency.

As shown in FIG. 8, the power cable 58 also includes connectors 58c and 58d that can be screwed together. By disconnecting the connectors 58c and 58d, the power cable 58 can be separated into a cable section on the backpack-type power supply 1 side and a cable section on the adapter 3 side.

Figure 9:
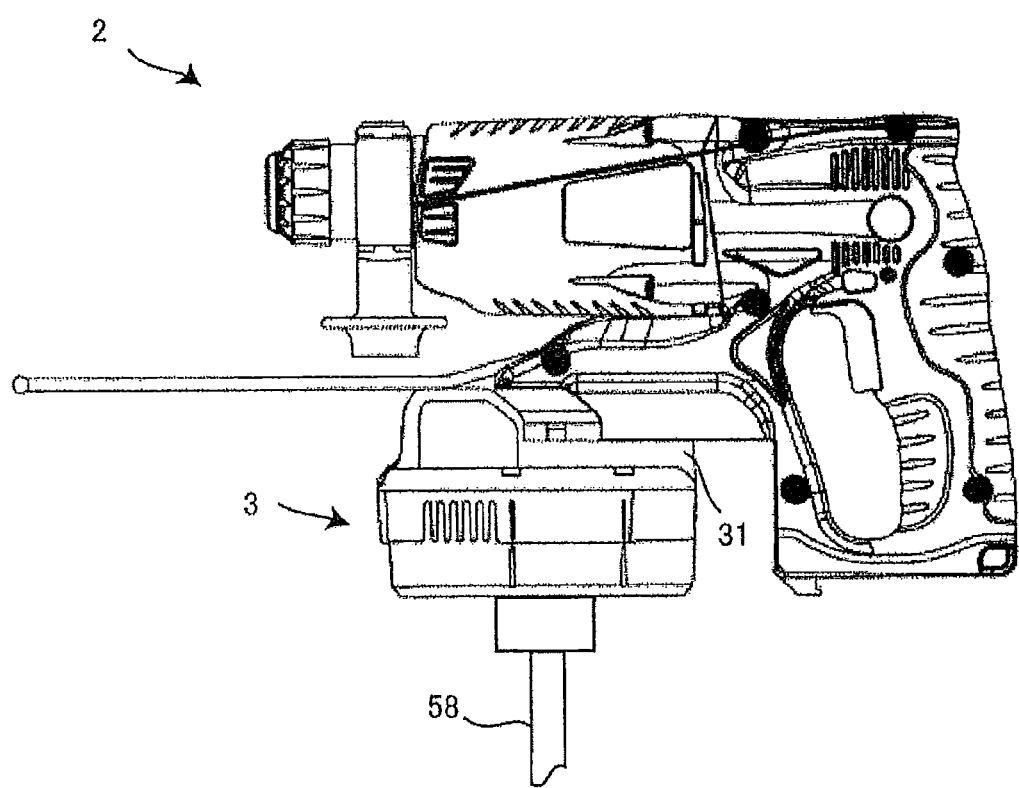
FIG. 9 is an explanatory diagram illustrating a connection between the adapter and a power tool, according to the first embodiment.

As shown in FIGS. 8 and 9, the adapter 3 is provided with a lateral-sliding connection part 31 on the top surface thereof for connecting the adapter 3 to the power tool 2. The power cable 58 is connected to the bottom surface of the adapter 3 and extends downward therefrom. With this construction, the power cable 58 applies a force to the adapter 3 in a direction (vertically in FIGS. 8 and 9) that differs from the direction in which the adapter 3 is disengaged from the power tool 2 (left-right direction in FIGS. 8 and 9). Accordingly, the adapter 3 is unlikely to become disconnected from the power tool 2 during operations.

The orthogonal relationship of the direction in which the power cable 58 applies force to the adapter 3 (vertically in FIGS. 8 and 9) and the direction in which the adapter 3 is disengaged from the power tool 2 (left-right direction in FIGS. 8 and 9) is a particular feature of this embodiment. The vertical force applied by the power cable 58 to the adapter 3 in this configuration functions as a frictional force against the left-right force for disengaging the adapter 3 from the power tool 2. Hence, this configuration effectively discourages the adapter 3 from becoming disengaged from the power tool 2.

Next, the circuit configuration of the adapter 3 will be described with reference to FIG. 7. The adapter 3 includes a first adapter-side positive terminal 3a, a first adapter-side negative terminal 3b, a second adapter-side positive terminal 3c, a second adapter-side negative terminal 3d, a pseudo battery type output terminal 3e, a pseudo battery temperature output terminal 3f, a discharge-halting signal output terminal 3g, and a pseudo signal output unit 32.

The first adapter-side positive terminal 3a and the first adapter-side negative terminal 3b can be respectively connected to the charger-side terminals 4a and 4b. Similarly, the second adapter-side positive terminal 3c and the adapter-side negative terminal 3d can be respectively connected to the battery-side terminals 5a and 5b through the power cable 58. Additionally, the pseudo battery type output terminal 3e and the pseudo battery temperature output terminal 3f can be respectively connected to the battery type input terminal 4c and the battery temperature input terminal 4d. The discharge-halting signal output terminal 3g can be connected to a discharge-halting signal input terminal of the power tool 2. The pseudo signal output unit 32 outputs pseudo signals within prescribed ranges via the pseudo battery type output terminal 3e and the pseudo battery temperature output terminal 3f.

The backpack-type power supply 1 according to the preferred embodiment has a large-capacity battery pack 51 that is capable of supplying a large electric current. Thus, in order to supply a large current, a thick (large gauge) power cable 58 is required. On the other hand, a thick power cable 58 can reduce the operating efficiency of the power tool 2 as the cable can become unwieldy. A slim power cable 58 is desirable.

In the preferred embodiment, a slim power cable 58 capable of supplying a large current is achieved by not providing the backpack-type power supply 1 with a battery type output terminal, a battery temperature output terminal, and a discharge-halting signal output terminal and by not providing the power cable 58 with signal lines corresponding to these terminals. Since the backpack-type power supply 1 having this construction cannot output a battery type signal and a battery temperature signal, a charger 4 configured to begin supplying power based on such signals cannot perform charging operations unless countermeasures are taken.

Thus, in the preferred embodiment, the adapter 3 is connected between the backpack-type power supply 1 and the charger 4. The adapter 3 has the pseudo signal output unit 32 for outputting pseudo signals within the prescribed ranges for instructing the charger 4 to perform charging operations.

However, since the pseudo signals outputted from the pseudo signal output unit 32 of the adapter 3 do not change when the battery pack 51 becomes fully charged or when an error occurs, this configuration alone cannot halt charging operations on the charger 4 end. Hence, in the preferred embodiment, the shutdown circuit 523 interrupts the current path when the battery-side microcomputer 526 detects that the battery pack 51 is fully charged and the like, thereby halting charging of the battery pack 51 provided in the backpack-type power supply 1. Thus, this configuration not only achieves a slim power cable 58 capable of supplying a large current, but also can suitably halt operations for charging the battery pack 51 when the battery pack 51 becomes fully charged or when an error occurs.

Note that the power tool 2 has a discharge shutdown circuit, and a conventional structure for interrupting the current path to the discharge shutdown circuit upon detecting overdischarge or overcurrent in the battery pack 51. Further, since the adapter 3 having the above structure detects voltage and current using a built-in microcomputer, the adapter 3 can transmit a signal for shutting down the current path to the discharge shutdown circuit of the power tool 2 upon detecting an error, such as overcurrent or excessive voltage drop. Since the current paths on both the backpack-type power supply 1 side and the power tool 2 side are interrupted when overdischarge or overcurrent occurs in the backpack-type power supply 1 according to the preferred embodiment, the construction of the preferred embodiment can more suitably reduce the likelihood that the battery pack 51 will degrade or malfunction.

Figure 10:
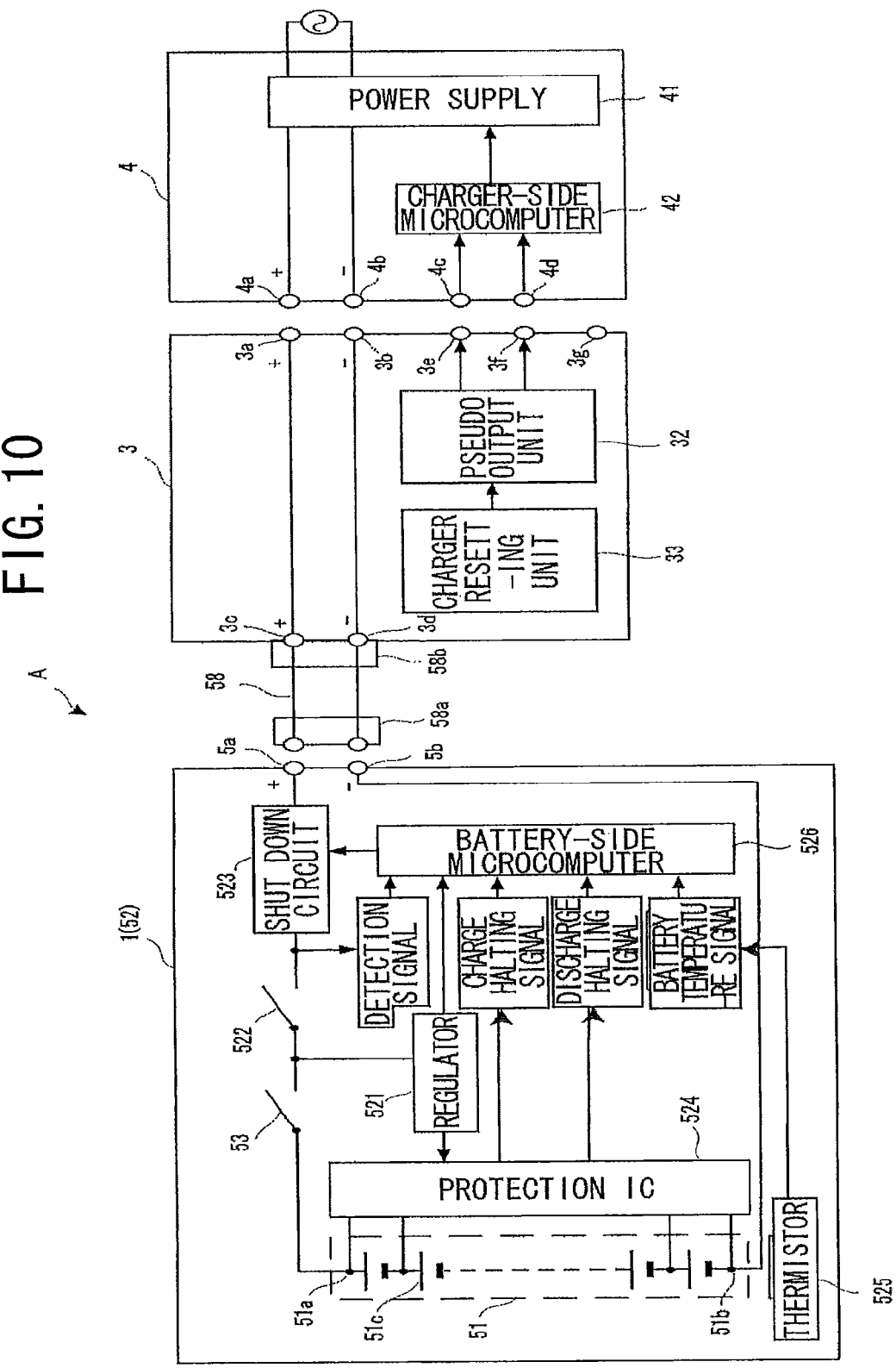
FIG. 10 is a circuit diagram of the backpack-type power supply, an adapter, and a charger, according to a second embodiment.

Next, a second embodiment of the present invention will be described with reference to FIG. 10, wherein like parts and components are designated with the same reference numerals to avoid duplicating description. In the second embodiment, the charger-side microcomputer 42 of the charger 4 has a timer function for counting elapsed time after charging has begun. Upon determining that the count has exceeded a prescribed time length, the charger-side microcomputer 42 performs a control process to halt the charging operation of the power supply 41.

However, this configuration is not able to fully charge a battery pack 51 that requires a longer charging time than the prescribed time when such a battery pack 51 is connected to the charger 4. Therefore, the adapter 3 in the second embodiment is further provided with a charger-resetting unit 33. The charger-resetting unit 33 outputs a timer reset signal to the charger-side microcomputer 42 in the charger 4 before the elapsed time from the start of the charging operation exceeds the prescribed time. The timer reset signal resets the count in the charger-side microcomputer 42 so that the charger 4 will continue the charging operation. Providing the charger-resetting unit 33 in this way can prevent a charger 4 with a timer function from ending the charging operation before the battery pack 51 connected to the charger 4 is fully charged, particularly when the battery pack 51 requires more charging time than the prescribed time.

In this case, there is potential for the battery pack 51 to be overcharged since the charger 4 itself cannot determine when the battery pack 51 is fully charged. However, the backpack-type power supply 1 according to the preferred embodiment can shut down the current path upon determining itself that the battery pack 51 is fully charged, as described above. Thus, the backpack-type power supply 1 can ensure that the battery packs 51 of various capacities can be fully charged, while preventing overcharging of the same.

While the invention has been described in detail with reference to the embodiments thereof, it would be apparent to those skilled in the art that various changes and modifications may be made therein without departing from the scope of the invention.

Figure 11:
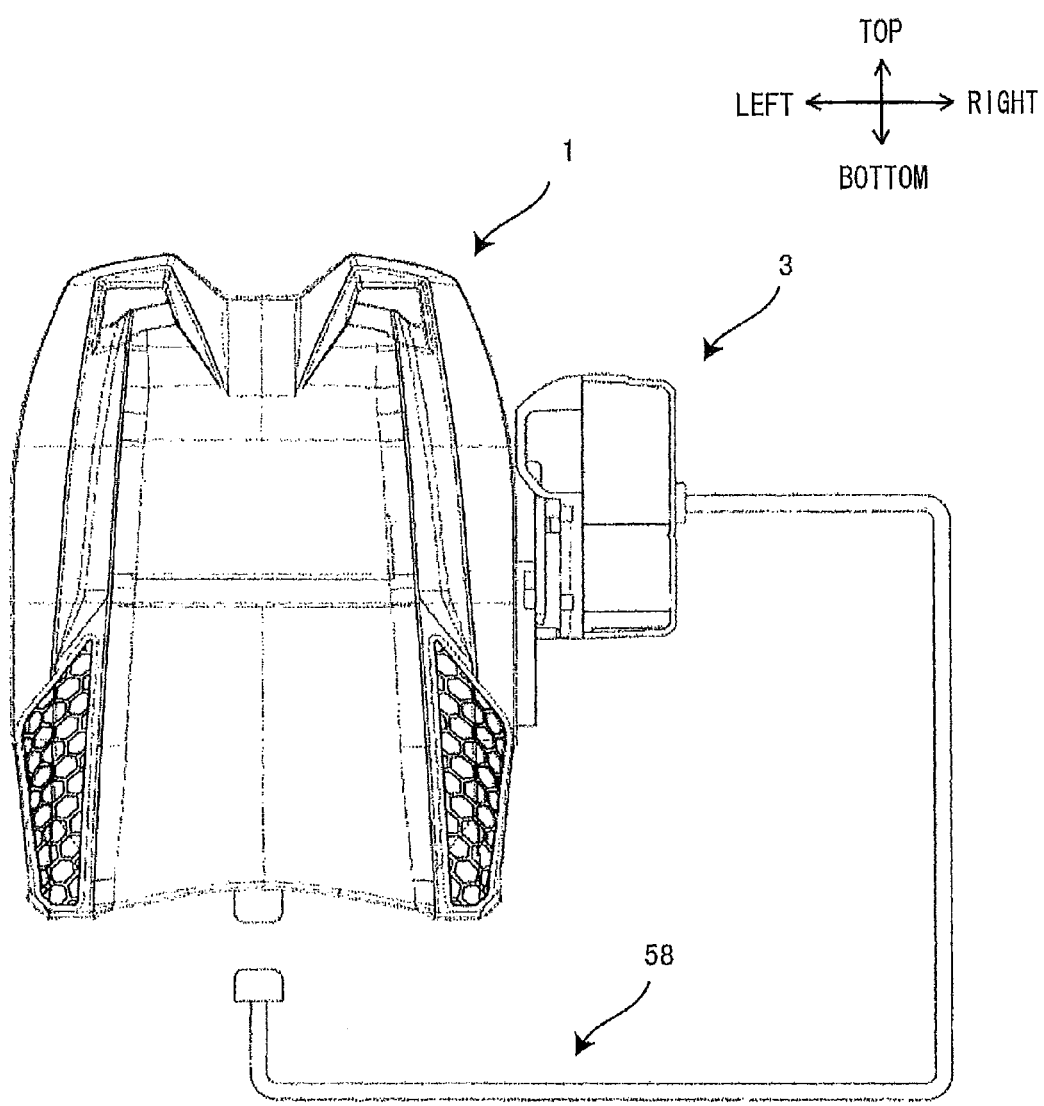
FIG. 11 is an explanatory diagram illustrating mount of an adapter to a case of a backpack-type power supply according to a modification.

For example, the backpack-type power supply 1 and the adapter 3 may be configured so that the adapter 3 can be mounted on (or accommodated in) the backpack-type power supply 1. For example, as shown in FIG. 11, the adapter 3 is mounted on the side surface of the case 5 on which the main power switch 53 is provided. With this configuration, the main power switch 53 may be turned off by mounting the adapter 3 on the backpack-type power supply 1. This configuration prevents the user from forgetting to switch off the main power switch 53 when finished using the backpack-type power supply 1, reducing the likelihood of the battery pack 51 overdischarging.

Alternatively, the main power switch 53 may be configured to shut off, for the same reason described above, when the connector 58a (or 58d) of the power cable 58 is detached from the backpack-type power supply 1.

Figure 12A:
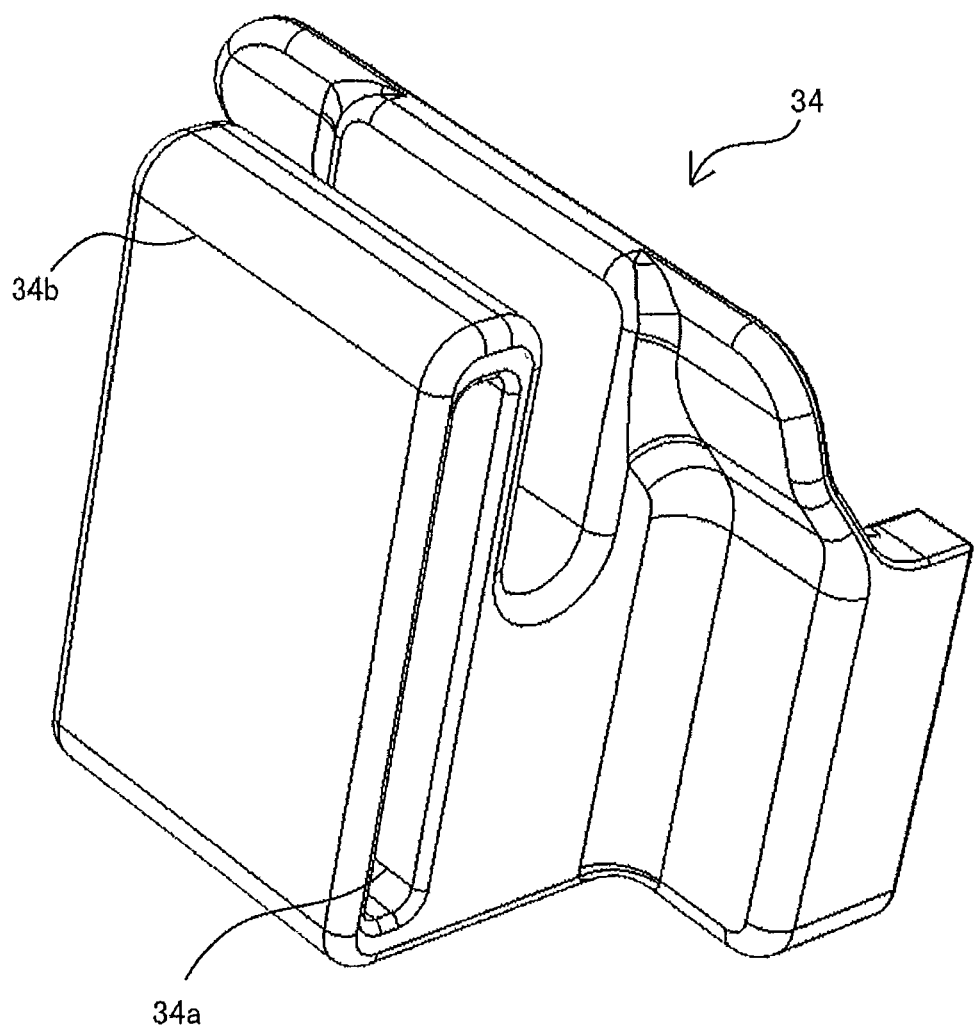
FIG. 12(a) is a perspective view of an adapter-accommodating member according to a modification.
Figure 12B:
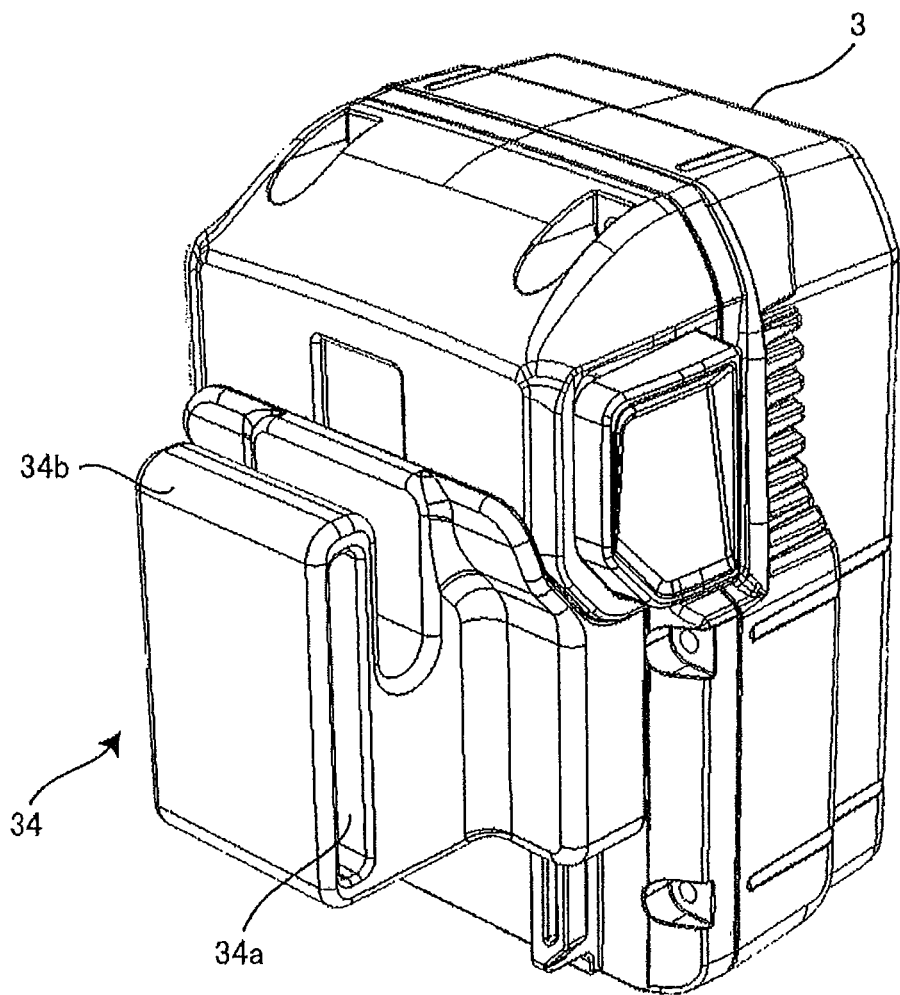
FIG. 12(b) is a perspective view of an adapter accommodated in the adapter-accommodating member according to the modification.

As shown in FIGS. 12(a) and 12(b), an adapter-accommodating member 34 capable of engaging with the adapter 3 may be provided on the waist belt 63 so that the adapter 3 does not interfere with user operations when not connected to the power tool 2. In the example of FIGS. 12(a) and 12(b), the adapter-accommodating member 34 has an insertion hole 34a through which the waist belt 63 is inserted. However, the adapter-accommodating member 34 may be provided with a clip having an inverted U-shape, enabling the adapter-accommodating member 34 to be simply clipped onto the waist belt 63.

The adapter 3 may also be provided with a winding part 34b, as shown in FIGS. 12(a) and 12(b), around which the power cable 58 can be wound. Use of the winding part 34b can prevent the excess portion of the power cable 58 from interfering with user operations.

Figure 13A:
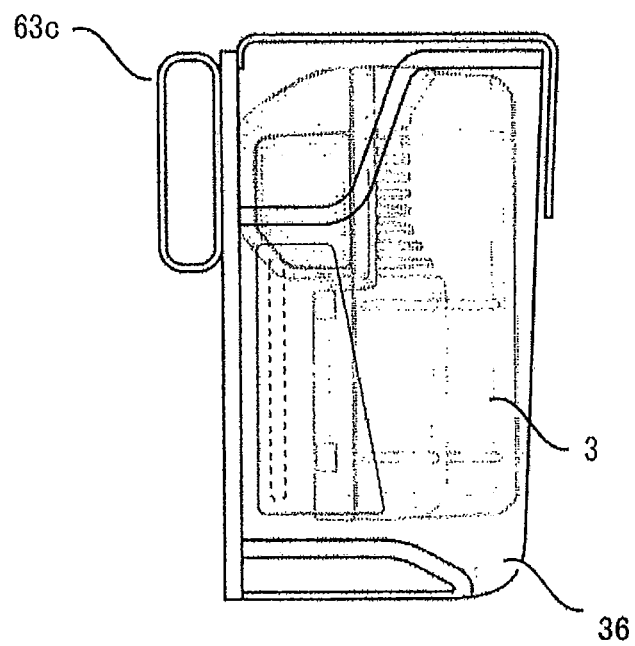
FIG. 13(a) is an external side view of an accommodating part according to a modification.
Figure 13B:
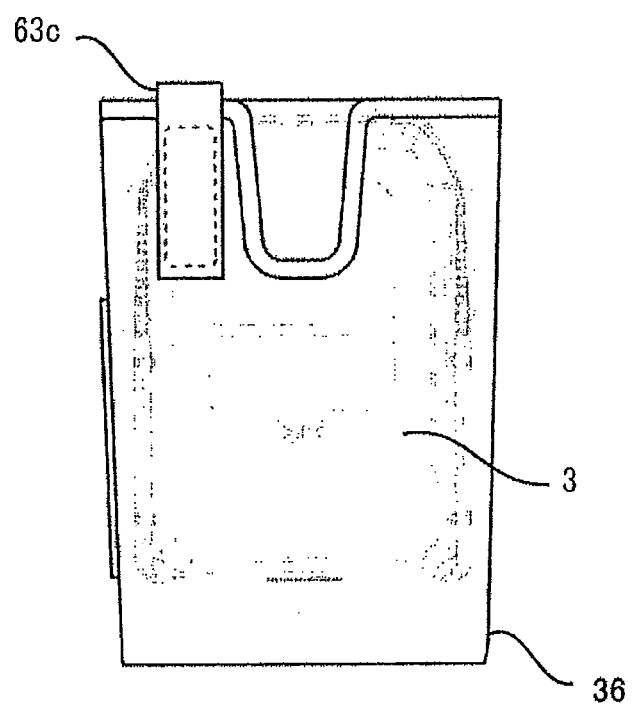
FIG. 13(b) is an external plan view of the accommodating part according to the modification.
Figure 13C:
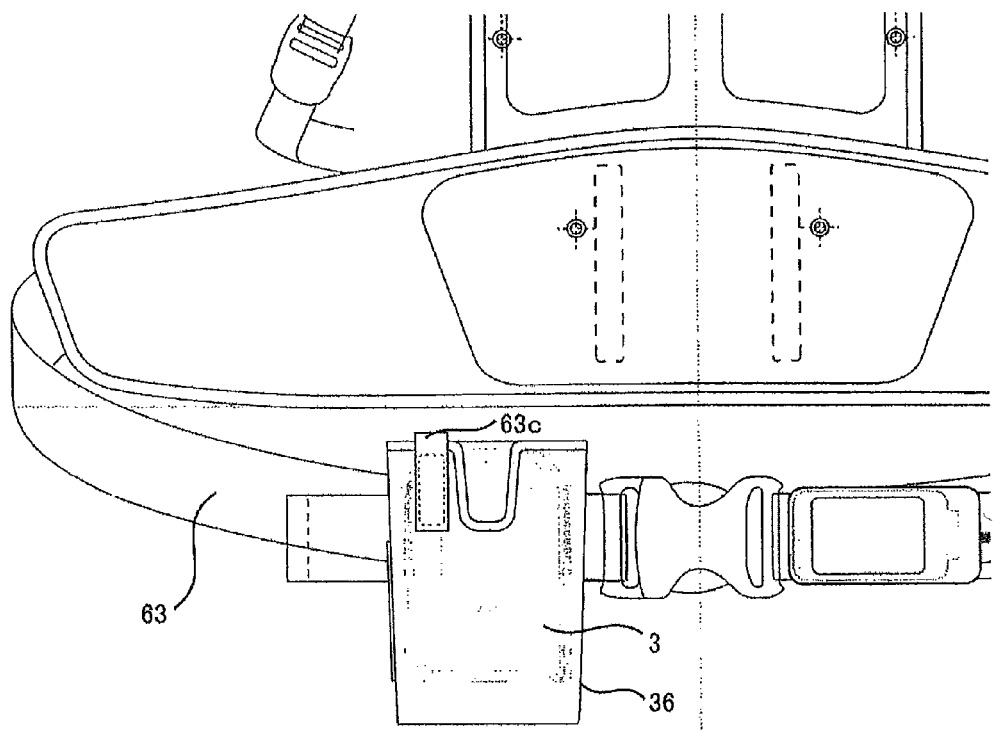
FIG. 13(c) is an explanatory diagram illustrating that the accommodating part is attached to a waist belt according to the modification.

As shown in FIGS. 13(a)-13(c), an accommodating part 36 capable of accommodating the adapter 3 may be attached to the waist belt 63 using an engagement part 63c. FIG. 13(a) shows a side view and FIG. 13(b) shows a plan view of the accommodating part 36. FIG. 13(c) shows that the accommodating part 36 is attached to the waist belt 63.

Figure 14A:
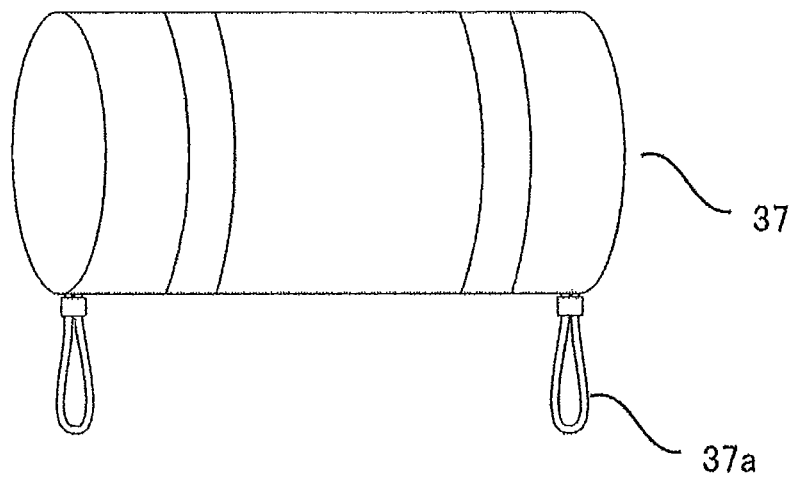
FIG. 14(a) is an external view of an accommodating part according to a modification.
Figure 14B:
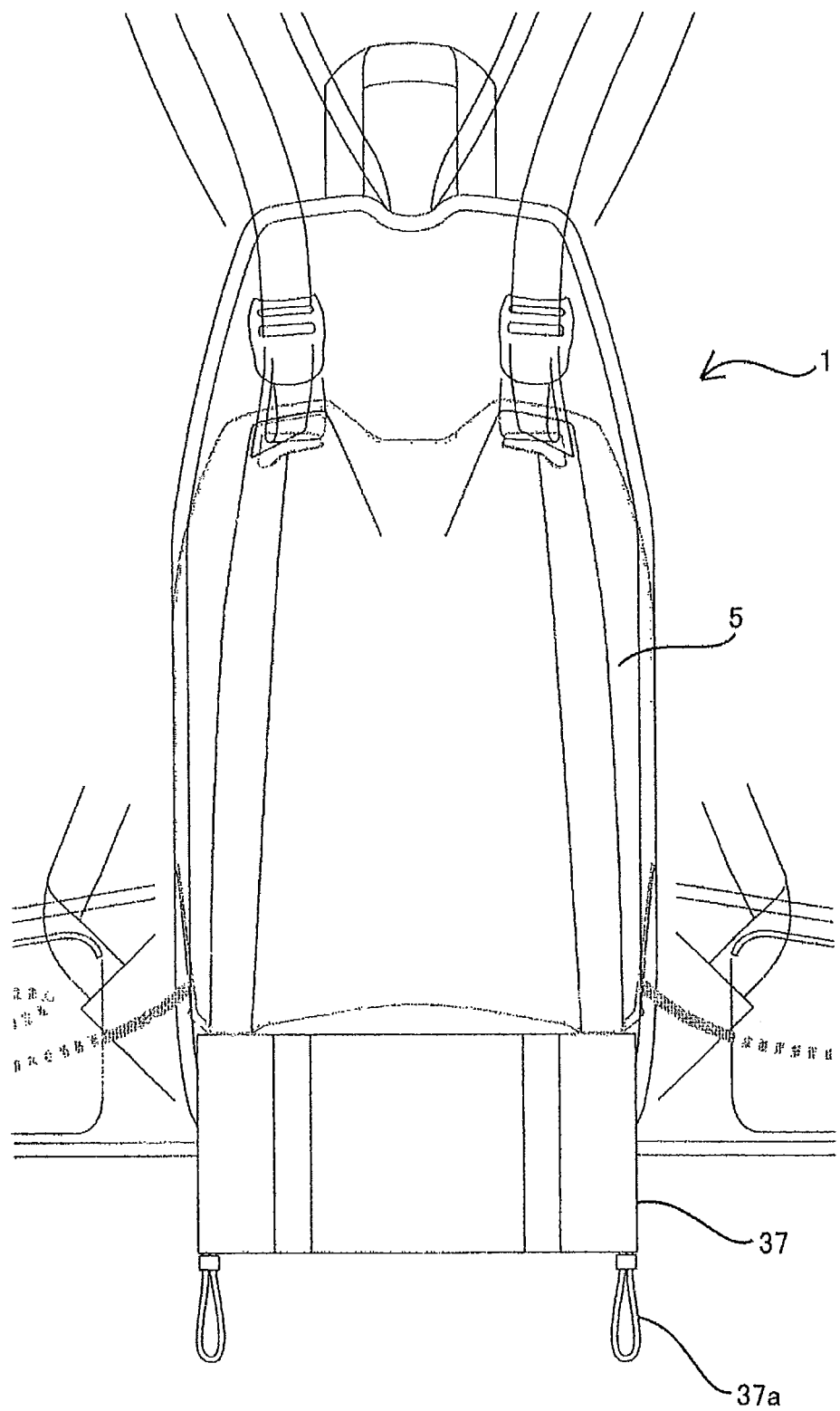
FIG. 14(b) is an explanatory diagram illustrating that the accommodating part is attached to a case according to the modification.

As shown in FIGS. 14(a) and 14(b), an accommodating part 37 capable of accommodating the adapter 3 may be attached to the harness 6 on or near the bottom end of the case 5. In this example, the accommodating part 37 is formed of cloth rolled up into a cylindrical shape. A string loop 37a is attached to each of the left and right ends of the accommodating part 37. Pulling the string loops 37a tight closes the open ends of the accommodating part 37.

With the accommodating part 37 attached to the case 5 in this way, the user must insert the adapter 3 into the accommodating part 37 behind the user's back while wearing the backpack-type power supply 1. However, this configuration facilitates insertion of the adapter 3 into the accommodating part 37.

Figure 15:
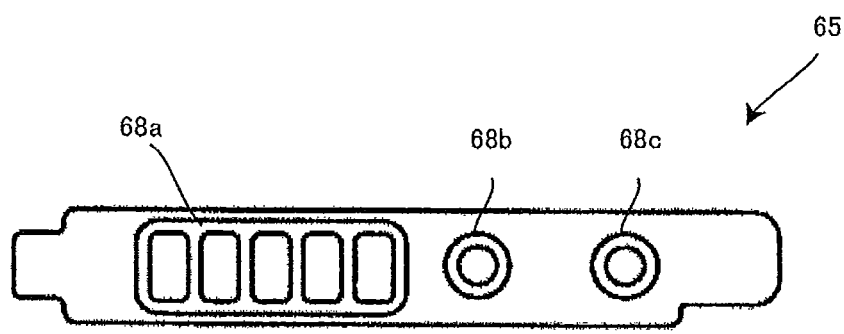
FIG. 15 is a top view of an operation unit according to a modification.

Further, the battery level LEDs 68a, the power LED 68b, and the malfunction LED 68c may be provided on the top surface of the operation unit 65, as illustrated in FIG. 15. With this arrangement, the user can check the remaining battery life of the battery pack 51 and the like without tilting the operation unit 65.

While the adapter 3 according to the preferred embodiment outputs the voltage produced from the backpack-type power supply 1 to the power tool 2 without change, the adapter 3 may modify the voltage to correspond to power tools 2 of various rated voltages. In this case, power cables 58 of different gauges may be used to correspond to the rated output of the power tool 2. Hence, a low-gauge (small-diameter) power cable 58 may be used to connect a low-output power tool 2, which can improve operating efficiency.

Alternatively, the backpack-type power supply 1 may be equipped with a voltage converter circuit in place of the adapter. In this case, the voltage converter circuit is settled outside of the switch 53, and it is preferably connected to the battery-side terminals 5a and 5b. That is, the switch 53 is between the positive terminals 51a and a positive terminal of the voltage converter that is connected to the positive terminal 5a.

In the preferred embodiment, the operation unit 65 communicates with the battery-side microcomputer 52b through the operation cable 64, but this communication may be implemented using a curl cord or may be implemented wirelessly.

In the preferred embodiment, the operation unit 65 is removably attached to the waist belt 63 with a hook and loop fastener. However, the operation unit 65 may be attached to the waist belt 63 through hooks, clips, a transparent pocket, or the like, or may be attached to the shoulder belts 62 instead.

In the second embodiment, the charger-side microcomputer 42 may be configured to halt charging operations upon receiving a reset signal or may treat a signal interruption to signify that a reset signal has been inputted and halt charging operations at this time. Therefore, the charger-resetting unit 33 of the adapter 3 may either output or interrupt the signal based on the type of charger-side microcomputer 42.

In order to prevent slippage between the padded part 61 and the contact surface 54, grooves may be formed in the surface of the padded part 61 opposing the contact surface 54. Here, a plurality of the grooves may be formed vertically, thereby extending in a direction orthogonal to the horizontal recessions 55 and the protrusions 56 formed on the contact surface 54.

The shutdown circuit 523 may interrupt the current path upon detecting that the battery pack 51 is fully charged or that an error has occurred. However, the shutdown circuit 523 may interrupt the current path in the other events occurs.

What is claimed is:

1. A backpack-type power supply comprising:
   a rechargeable battery configured to supply electrical power to a power tool;
   a battery accommodating portion accommodating the rechargeable battery;
   a cable extending from the battery accommodating portion;
   a harness supporting the battery accommodating portion and configured to be worn on a back of a user;
   an operation unit connected to the cable, the operation unit including a switch configured to switch power supply on and off from the rechargeable battery to the power tool; and
   a power cable through which the rechargeable battery is configured to supply electrical power to the power tool;
   wherein both the cable and the power cable are connected to the rechargeable battery, the cable being capable of extending in a direction different from a direction in which the power cable is capable of extending.

2. The backpack-type power supply according to claim 1, wherein the operation unit includes a display unit configured to display an indication of remaining battery level of the rechargeable battery.

3. The backpack-type power supply according to claim 1, wherein the operation unit is attachable to the harness.

4. The backpack-type power supply according to claim 3, wherein the harness includes a waist belt configured to be wrapped around the user's waist and the operation unit is attachable to the waist belt.

5. The backpack-type power supply according to claim 4, wherein the operation unit includes a display unit configured to display an indication of remaining battery level of the rechargeable battery,
   wherein the display unit includes a display surface on which the indication of the remaining battery level is displayed, and
   wherein the operation unit is attachable to the waist belt so that the display surface faces upward when the user wears the battery accommodating portion on the back of the user.

6. A backpack-type power supply comprising:
   a rechargeable battery configured to supply electrical power to a power tool;
   a battery accommodating portion accommodating the rechargeable battery;

a cable extending from the battery accommodating portion;

a harness supporting the battery accommodating portion and configured to be worn on a back of a user;

a display unit configured to display an indication of remaining battery level of the rechargeable battery, the display unit being connected to the cable, and, a power cable through which the rechargeable battery is configured to supply electrical power to the power tool;

wherein the display unit is attachable to the harness;

wherein both the cable and the power cable are connected to the rechargeable battery, the cable being capable of extending in a direction different from a direction in which the power cable is capable of extending.

7. The backpack-type power supply according to claim 6, wherein the harness includes a waist belt configured to be wrapped around the user's waist, and wherein the display unit is attachable to the waist belt.

8. The backpack-type power supply according to claim 7, wherein the display unit includes a display surface on which the indication of remaining battery level of the rechargeable battery is displayed, and wherein the operation unit is attachable to the waist belt so that the display surface faces upward when the user wears the battery accommodating portion on the back of the user.

9. The backpack-type power supply according to claim 6, wherein the display unit includes a switch configured to switch power supply on and off from the rechargeable battery to the power tool.

10. A backpack-type power supply comprising:

a rechargeable battery configured to supply electrical power to a power tool;

a battery accommodating portion accommodating the rechargeable battery;

a harness supporting the battery accommodating portion and configured to be worn on a back of a user; and a first power cable connectable to the power tool via an adapter and being a part of a power supply path through which electrical power from the rechargeable battery is supplied to the power tool, wherein the first power cable has a first connector at one end thereof and a second connector at another end thereof, the first connector being detachably connectable to a rechargeable battery side of the power supply path, the second connector being detachably connectable to the adapter.

11. The backpack-type power supply according to claim 10, further comprising a second power cable having one end connected to the rechargeable battery side of the power supply path and another end, the second power cable further having a third connector at the another end, wherein the third connector is configured to be connected to the first connector so as to supply the electrical power from the rechargeable battery to the power tool.

* * * * *